Figure 1:
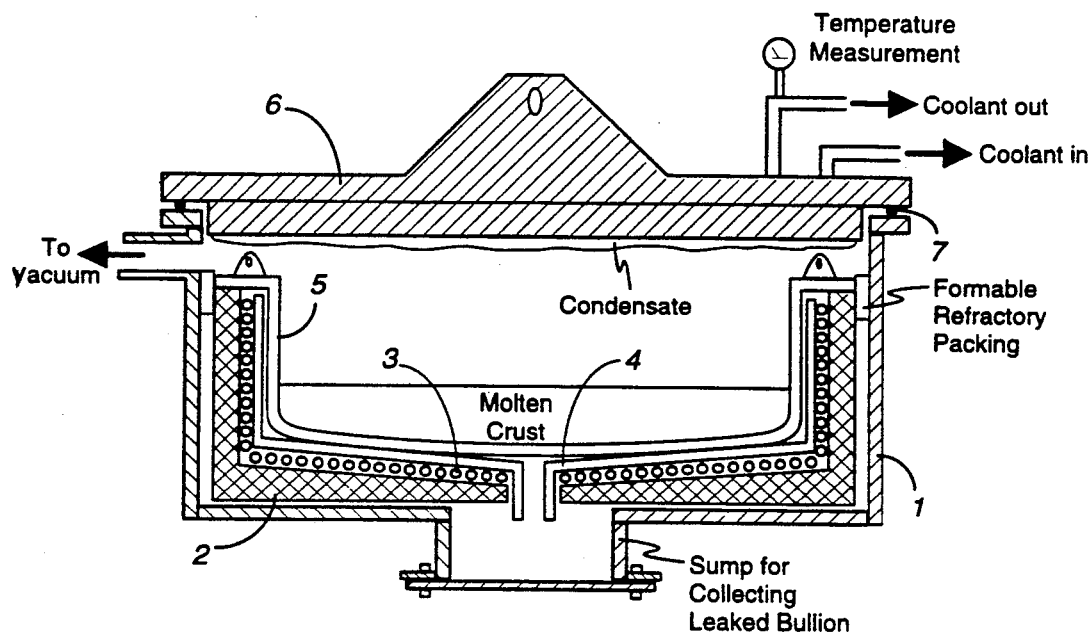

United States Patent [19]

Evans et al.

[11] Patent Number: 5,232,486
[45] Date of Patent: Aug. 3, 1993

[54] ONE STEP PROCESS FOR THE TREATMENT OF PARKES DESILVERING CRUST TO RECOVER ZINC AND PRODUCE A SUITABLE FEED FOR CUPELLATION

[75] Inventors: Philip G. Evans, Bathurst; Peter J. Hancock; Cameron L. Harris, both of Montreal; Ralph L. Harris, St. Lambert, all of Canada

[73] Assignee: Brunswick Mining and Smelting Corporation Limited, Bathurst, Canada

[21] Appl. No.: 808,635

[22] Filed: Dec. 17, 1991

[30] Foreign Application Priority Data

Apr. 23, 1991 [CA] Canada .................................. 2041066

[51] Int. Cl.⁵ .............................................. C22B 19/04
[52] U.S. Cl. ...................................... 75/380; 75/10.3; 75/634; 75/665
[58] Field of Search ................. 75/702, 634, 665, 10.3, 75/380

[56] References Cited

U.S. PATENT DOCUMENTS 3,774,892 11/1973 Althabegoity ........................ 75/665
4,734,129 3/1988 Knight ................................. 75/634

FOREIGN PATENT DOCUMENTS 788525 1/1958 United Kingdom .................. 75/665

Primary Examiner—Melvyn J. Andrews
Attorney, Agent, or Firm—Keck, Mahin & Cate

[57] ABSTRACT

A process of treating argentiferous alloy variously called "zinc crust" or "silver crust", obtained in the separation of silver from lead, removes sufficient zinc in one apparatus and process step to ensure the product is suitable as feed to cupellation. Suitable feed is defined as material, when partially oxidized in a cupel to remove impurities from silver, results in a litharge that is liquid at typical cupellation temperatures. The process requires that care be taken to avoid excessive oxidation of the crust during its formation. No preliminary step to upgrade the crust is necessary, avoiding the associated expense and effort.

2 Claims, 1 Drawing Sheet

ONE STEP PROCESS FOR THE TREATMENT OF PARKES DESILVERING CRUST TO RECOVER ZINC AND PRODUCE A SUITABLE FEED FOR CUPELLATION

This invention relates to a process for the treatment of argentiferous alloy obtained in the separation of silver from lead that will recover zinc and produce a material suitable for cupellation in one process step without the need for the addition of reagents.

The separation of silver from impure lead bullion produced in a lead smelting furnace is almost invariably performed by adding zinc according to the Parkes process. However, whichever the procedure used, be it the classic Parkes process or a continuous process as in operation at Broken Hill Associated Smelters at Port Pirie in South Australia, an intermediate product results which floats on the surface of the bath and contains almost all of the silver. This intermediate product is called silver crust or zinc crust. The composition of the crust lies between 5 to 10% Ag, 15 to 30% Zn, the remainder being lead with a small amount of oxygen and other contaminants such as copper.

This zinc crust is subsequently treated for the purpose of recovering the zinc it contains, and the zinc so recovered is then reused for the removal of silver from lead. Three processes are currently employed to achieve the zinc removal.

The classic process is to place the crust, possibly after an initial enrichment or "drying" has taken place by allowing the crust to lie exposed to the atmosphere for some time whilst a lead rich alloy forms a pool underneath the dried crust, into a graphite or silicon carbide retort fitted in a furnace of the "Faber du Faur" type. This retort is heated at about 1300° C. and the zinc is collected at the mouth of the retort on a condenser. There remain in the retort a lead having a high content of silver which is consequently oxidized to yield metallic silver, and mixed oxides of lead and zinc, still having a high content of silver, which must be either melted once again with litharge or carbon to effect their reduction yielding another portion of lead rich in silver which is then subjected to oxidation (cupellation) to recover silver, or returned to the main lead stream at some stage before the desilvering step where any entrained silver is taken up by the bullion. However, this process involves certain disadvantages, namely 1) Only a fraction of the zinc contained in the crust is recovered in the form of distilled zinc, so that zinc losses occur,
2) An appreciable proportion of the zinc remains in the lead of high silver content obtained after the distillation of the zinc, further contributing to zinc losses,
3) The retorts for heating the zinc crust are expensive and have short lives,
4) The mixed oxides of lead and zinc formed in the retort, as mentioned before, require either further treatment or create a substantial recycle of silver back to an earlier step of refining. Either alternative greatly increases the cost of the whole process for the treatment of zinc crust.

The second process is a significant improvement to the classical method described above in that it avoids the production of large quantities of the mixed oxides of lead and zinc and reduces the quantity of material that must be treated by utilizing an initial enrichment step. This process operates at reduced pressure to effect rapid dezincing of the silver crust at lower temperatures and by nature of the vacuum type furnace, avoid any oxidation of the crust. The process comprises the steps of adding the argentiferous alloy to a vacuum tight vessel to which heat is supplied by means of electrical resistors above the surface of the bath, raising the temperature of the alloy to between 750° and 850° C., thereby vaporizing the zinc, conducting the zinc vapour through a vacuum-tight passage to a vacuum-tight condenser, condensing it therein, maintaining in the vacuum-tight enclosure formed by the furnace, passage and condenser a pressure of 3 mm to 12 mm of Hg, maintaining automatically the temperature of the condensed zinc at 420° to 450° C., cutting off the supply of heat when the alloy reaches a temperature of 1000° C., indicating that there is no more zinc being transferred from the furnace to the condenser. This method recovers the bulk of the zinc, but the high temperatures necessitate the use of a complex refractory lined vessel.

It has become standard practice operationally to include a preliminary enrichment step to remove the bulk of the entrained lead. The enrichment is carried out in a separate vessel where a salt flux liquation is performed. The crust is added at intervals to the bath which is held at 720° C. The crust melts and separates into two distinct phases due to the different density of the phases. The less dense top phase typically consists of 30% Ag, 60% Zn and 10% Pb, whilst the lower more dense phase is predominantly lead with about 0.5% Ag and 2% Zn. The surface of this melt is covered with a molten salt of NaCl and CaCl of eutectic composition, into which any oxides present are taken into solution. This characteristic of the process is particulaly important, because is prevents zinc oxide going forward in the process. This zinc oxide would not be removed by the vacuum treatment, and would report to the cupel contributing to litharge freezing problems. The silver rich phase is passed to the vacuum distillation unit, whilst the low silver phase is returned to the Parkes desilvering step. The oxide bearing salt is leached to recover salt, the oxides residue being recycled to the smelting process. A disadvantage of this process is that the silver rich alloy requires the re-addition of some of the lead removed by the liquation to obtain a sufficiently high Zn vapour pressure above the alloy to allow effective vacuum distillation. The product from this process is also unsuitable for cupellation, the extent of zinc removal not being sufficient to avoid the freezing of litharge in the cupel, necessitating the addition of lead a it will be disclosed later. This necessity may be satisfied by the addition of lead before the vacuum treatment takes place.

The third process is a further refinement of the second. The nature of the process is similar to that of the second process inasmuch as it operates at reduced pressures avoiding oxidation and obtaining satisfactory kinetics, and results in a low zinc silver rich alloy in a furnace and liquid zinc in a condenser. It varies in one significant way. The furnace is heated using induction rather than by means of electrical resistance as described above. This enhances process kinetics by causing induction stirring of the alloy in the furnace, and eliminates the consumption of heating resistors. These improved kinetics mean that the re-addition of lead that has just been removed to increase the vapour pressure of zinc becomes unnecessary. The disadvantages of this process are, similar to the aforementioned process, the need for a preliminary salt flux liquation step which often results in poor plant cleanliness unless great care is taken and the high capital cost of the vacuum induction unit. This process also requires that addition of lead to the product before successful cupellation can be carried out.

It is the object of the present process to provide a process which treats crust that has been specially produced by the Parkes process, or any other equivalent process, and in one step recovers zinc to be reused in the Parkes process, and results in a product that can be fed directly to cupellation without the need for the readdition of lead.

For a material to be suitable as feed for a cupel, it is essential that the oxidised metals that reside on the surface of the bullion in the cupel (litharge) possess such a composition as to be liquid at temperatures existing in the cupel. For this to be the case, the mass ratio of lead to zinc in the litharge is kept above roughly 20. Whilst the theoretical limit is nearer to 12, and fluxing may allow a lower ratio to be safely used, industrially a value of around 20 is adhered to. The best currently available process utilises a salt flux liquation step to remove the vast majority of the lead from the crust. It can be readily seen that to conform with the necessary lead to zinc ratio, considerable effort must be made to effect near complete removal of zinc now that most of the lead is gone. Commensurate to this effort is the complexity and cost of the process step required. Moreover, the best available technology still regularly fails to reduce the zinc to sufficiently low levels as to result in low melting point litharge, the readdition of lead being commonplace.

The process in accordance with the present invention comprises taking the crust skimmed from the Parkes process and placing it directly into a vacuum dezincing unit without a prior salt flux liquation step. The pressure and temperature of the vacuum-dezincing unit are dependant on each other, but a minimum temperature of 720° C. must be exceeded. The alloy product from this device is charged directly to the cupel without the need for any lead addition, the zinc condensate being returned to the Parkes process as is usual.

The benefits of this approach are manifold. The absence of the salt flux liquation step results in the presence of considerable quantities of lead which enhances the vapour pressure of zinc facilitating zinc removal under vacuum. It becomes easy to conform to the critical lead to zinc ratio due to the presence of the large quantity of lead. This means that the extent to which zinc must be removed from the crust is not as great. Consequently, a much more simple and inexpensive apparatus can be used to carry out the zinc removal.

However one condition must be met to allow this process to function properly. Whereas the current technology has the benefit of a salt flux liquation step to remove any zinc oxide from the crust so that it is not be carried through to the cupel, the elimination of this step means that the present process has no means of removing zinc present as zinc oxide. By nature of the process being a vacuum process, no oxidation of zinc will occur during the treatment. However, it is important that the extent to which the crust is allowed to oxidise during the Parkes process is kept to a minimum. This can be readily achieved by simple operating procedures in the plant, such as gas shrouding.

The vacuum dezincing process comprises enclosing the as-skimmed alloy or crust in a vacuum-tight furnace, and supplying heat to raise the temperature of the alloy to between 720° and 750° C., thereby vaporizing zinc which travels to a condenser maintained at a temperature below the melting point of zinc whereby the zinc vapour condenses to solid zinc, the pressure inside the furnace being maintained below 100 $\mu$m of Hg. The operation is continued for a time sufficient to effect satisfactory dezincing of the crust.

Such time may be determined by monitoring the outlet temperature of a coolant which is passed through the condenser. The operation is stopped at a predetermined time interval after a peak in the outlet temperature of the coolant being passed through the condenser at a constant flowrate and inlet temperature has been observed.

The outlet temperature under these conditions is a measure of the rate of zinc condensation, the heat being liberated by the deposition of zinc versus the temperature of the coolant. Some function of the difference between the inlet and outlet temperature could also be used for this purpose if the inlet temperature were not constant.

Under these conditions, at least 80% of the zinc reports to the condensate, the vast majority of the lead and silver remaining in the bath. This bath consists of two phases, a liquid which is almost entirely lead and silver, containing no more than 0.5% Zn, on top of which floats an oxide-rich dross that contains up to 10% Zn. The dross floating on the top of the liquid metal represents a very small mass fraction of the contents of the furnace. The total quantity of zinc remaining in these two phases is sufficiently small so that they can be charged together to the cupellation step without any difficulties being encountered as a result of a high melting point litharge forming. No preliminary "drying" or salt flux liquation is required or indeed desirable.

The significant improvement to current technology and practices derives from the utilization of the fact that solid zinc has a much lower vapour pressure than that of liquid zinc. If the zinc is condensed to the liquid state, as is the practice in all current processes, the lowest operating pressure permissable is equal to that of the vapour pressure of liquid zinc at the condenser operating temperature. By condensing the zinc to the solid phase, the ability to operate at much lower pressures becomes available. By operating at lower pressure and treating crust that has not undergone any initial enrichment step so that the zinc vapour pressure of the crust is still high, it is possible to achieve rapid process kinetics and sufficient zinc removal without the need to operate at very high temperatures. This, in turn, reduces the complexity of the furnace, which results in much lower capital costs.

Figure 2:
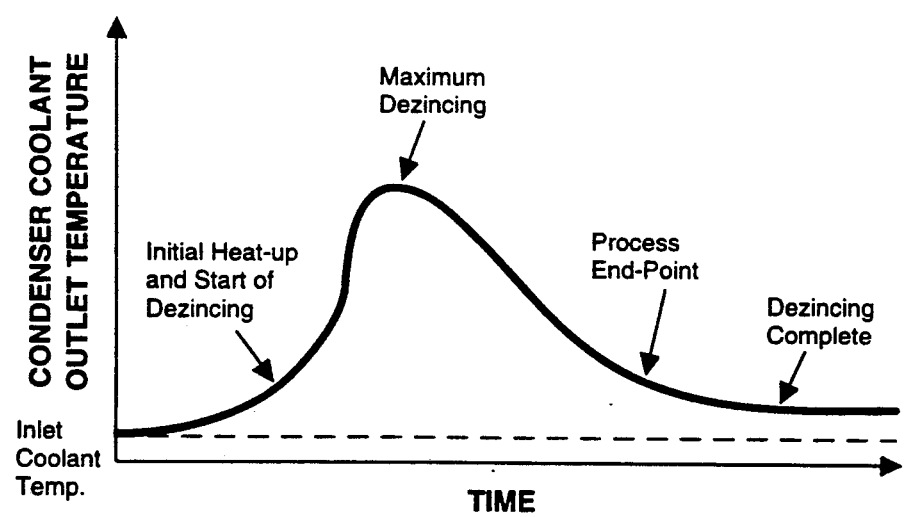

The invention will now be disclosed, by way of example, with reference to the accompanying drawings in which:

FIG. 1 is a cross-section view through a dezincing apparatus used in the process in accordance with the present invention, and FIG. 2 is a diagram illustrating the condenser coolant temperature versus time.

Referring to FIG. 1, there is shown a crust vacuum dezincing apparatus consisting of a vacuum chamber 1, made for example of welded sheet metal, containing a refractory mounting 2 which supports a resistance heating element 3 under a protective shield 4, which has a passage at its lowest point leading to a vacuum tight sump. Placed on top of the protective shield is a cast iron or specialty steel vessel 5 to contain the crust. The protective shield is necessary in the event of a vessel failure to prevent resistance element damage. Any molten crust that leaks will be collected in the sump for recovery at some later time. The top 6 of the vacuum chamber is removable, this top being liquid-cooled and acting as the condenser. The vacuum seal is maintained by an O-ring 7 extending around the circumference of the top. The outlet to the vacuum pump (not shown) is in the side of the vacuum chamber, the gas passing through a filter (not shown) before reaching the vacuum pump. The installation must be absolutely gas tight to enable a pressure of 100 micrometers of Hg at most to be maintained within it.

It will be readily realized that the dimensions of the installation will depend on the contemplated capacity and throughput.

The operation takes the following course:

The quantity of crust to be treated as governed by the capacity of the vessel is charged into the vessel 5 from above whilst the top 6 of the furnace is removed. The top is then placed onto the vacuum chamber 1 and a seal formed by the circumferential O-ring 7. The vacuum pump is started. By means of the resistance heating elements 3, the temperature of the crust is raised to between 720° C. and 750° C. Whilst the temperature is increasing, the pressure in the vacuum chamber must fall to below 100 micrometers (0.0001 meters) of mercury, or $1.3 \times 10^{-4}$ atmospheres. Coolant supplied to the condenser/top 6 maintains the surface of the condenser to well below the melting point of zinc, namely 419° C. This cooling rate must be sufficiently high to ensure that at no time does whatever condensate that forms on the condenser be allowed to approach this melting temperature. The operation will continue for sufficient time as to effect satisfactory dezincing of the crust. This time can be determined by monitoring the outlet temperature of the condenser coolant. During dezincing, much heat is transferred from the molten crust to the condenser due to the transfer of the latent heat of solidification and any sensible heat of the zinc as well a the heat being passed by radiation and convection, which will be shown by a corresponding increase in the coolant temperature at the outlet of the condenser provided a constant flowrate of coolant is passed through the condenser for the duration of the treatment. When the dezincing is complete, the rate of heat transfer will be much lower, thus resulting in a decrease in the coolant outlet temperature, ultimately coming to a steady temperature corresponding to the heat being removed in the coolant being equal to the heat being transferred to the condenser by radiation and convection only. At some time between the peak coolant outlet temperature and the final steady state coolant outlet temperature to be determined by experience gained in the operation of the specific apparatus being operated, the end-point of the process will be. FIG. 2 shows graphically one operation cycle.

The results of a plant scale trial reproducing conditions very similar to those created by the installation that is the subject of this application are described below:

Untreated crust skimmed directly from the surface of a Parkes desilvering kettle contained:

| Ag | 5.41 Wt % |
| Zn | 15.42 Wt % |

Remainder Pb with some oxygen and other minor contaminants such as copper.

3792 kg of this crust was charged directly to the vessel on top of a residue of molten crust resultant from previous trials weighing 13000 kg and containing 2.55% Ag and 0.06% Zn, and treated as described above for a period of five hours including the heat-up period. This resulted in 492 kg of zinc containing virtually no silver and no lead being attached to the condenser. This represents over 84% removal of the zinc from the crust. The remainder of the zinc reported to a bullion phase and a dross phase present in the bottom of the vessel. The bullion phase weighed 15400 kg and contained 2.78% Ag and 0.19% Zn. The dross phase weighed 900 kg and contained 12% Ag and 4.1% Zn. The mass balance closed to 99.8% for Ag, and 91.2% for Zn. This performance is sufficient to give a product suitable for the next step in silver production, namely cupellation.

We claim:

1. A process of treating a zinc-containing argentiferous alloy crust obtained in the separation of silver from lead to recover zinc from the crust, which comprises enclosing the crust in a vacuum-tight furnace, supplying heat to the furnace to raise the temperature of the charge to between 720° C. and 750° C., thereby selectively vaporizing the zinc which travels to a condenser maintained at a temperature below the melting point of zinc whereby the zinc vapor condenses to solid zinc, maintaining the pressure inside the furnace below 100 $\mu$m of Hg, and continuing to treat the crust for a sufficient time to effect satisfactory dezincing of the crust.

2. A process as defined in claim 1, wherein a coolant is circulated between an inlet and an outlet in the condenser, said time is determined by monitoring the outlet temperature of the coolant which is passed through the condenser, and the process is stopped at a selected time between the time when a peak in the outlet temperature of the coolant being passed through the condenser, at a constant flowrate an inlet temperature, has been observed and the time when a steady state coolant outlet temperature is reached.

* * * * *